United States Patent [19]

Hirasawa et al.

[11] Patent Number: 5,375,822
[45] Date of Patent: Dec. 27, 1994

[54] FLUID-FILLED CYLINDRICAL ELASTIC MOUNT HAVING TWO ORIFICES AND VALVE ASSEMBLY FOR OPENING AND CLOSING ONE OF THE ORIFICES

[75] Inventors: Nobuhiro Hirasawa; Masaaki Mishima, both of Kasugai, Japan

[73] Assignee: Tokai Rubber Industries, Ltd., Japan

[21] Appl. No.: 110,737

[22] Filed: Aug. 23, 1993

[30] Foreign Application Priority Data

Aug. 26, 1992 [JP] Japan .................. 4-250765

[51] Int. Cl.$^5$ .............................. F16M 5/00
[52] U.S. Cl. ................... 267/140.15; 188/299
[58] Field of Search .......... 267/35, 292, 293, 140.12, 267/140.15, 141.2; 188/299; 248/562, 636

[56] References Cited

U.S. PATENT DOCUMENTS 4,858,899 8/1989 Saotome et al. ............... 267/140.12

FOREIGN PATENT DOCUMENTS

2-245538 10/1990 Japan .
4-25636 1/1992 Japan .................. 267/140.15
4272534 9/1992 Japan .................. 267/140.15

Primary Examiner—Robert J. Oberleitner
Assistant Examiner—Lee W. Young
Attorney, Agent, or Firm—Parkhurst, Wendel & Rossi

[57] ABSTRACT

A fluid-filled cylindrical elastic mount is disclosed which includes an inner and an outer sleeve connected by an elastic body, and a pair of fluid chambers formed in the elastic body. A non-compressible fluid contained in the mount flows between the fluid chambers, through one of two differently tuned orifice passages defined by an orifice structure. One of the orifice passages having the higher ratio of its cross sectional area to its length is formed at least partially as a tunnel extending through a tunnel-defining portion of the orifice structure. A valve assembly including a rotary valve and a valve housing is attached to the orifice structure such that the rotary valve is located in the tunnel of the orifice passage and such that the valve housing is fixed to a radially outer surface of the tunnel-defining portion which is exposed to an outside of the mount. The rotary valve rotatably received in the valve housing is selectively placed in a position for permitting flow of the fluid through the orifice passage, and in a position for inhibiting the flow of the fluid therethrough.

10 Claims, 6 Drawing Sheets

FLUID-FILLED CYLINDRICAL ELASTIC MOUNT HAVING TWO ORIFICES AND VALVE ASSEMBLY FOR OPENING AND CLOSING ONE OF THE ORIFICES

BACKGROUND OF THE INVENTION

1. Field of the Invention

The present invention relates in general to a fluid-filled cylindrical elastic mount which provides a desired vibration damping or isolating effect based on flow of a fluid contained therein, and more particularly to such a cylindrical elastic mount that exhibits different vibration damping or isolating characteristics depending upon a frequency range of input vibrations.

2. Discussion of the Related Art

A cylindrical elastic mount is known as a vibration damper interposed between two members of a vibration system, to flexibly connecting the two members or flexibly mounting one of the two members on the other member. The cylindrical elastic mount includes an inner sleeve, an outer sleeve disposed radially outwardly of the inner sleeve with a suitable spacing therebetween, and an elastic body for elastically connecting these sleeves. In recent years, there is proposed a so-called fluid-filled cylindrical elastic mount having a pair of fluid chambers formed between the inner and outer sleeves, and an orifice passage through which the fluid chambers are held in fluid communication with each other. This elastic mount is adapted to damp vibrations applied thereto, based on the resonance of the fluid flowing through the orifice passage.

However, the known fluid-filled cylindrical elastic mount of the above type provides a sufficiently high damping effect with respect to a certain range of frequency of the input vibrations. That is, the damping of the input vibrations based on the resonance of the fluid flowing through the orifice passage is effective only to a predetermined frequency band to which the orifice passage is tuned. If the orifice passage is tuned so that the elastic mount provides an excellent damping effect with respect to vibrations in a relatively low frequency range, the amount of the fluid flowing through the orifice passage is almost negligible as if the orifice passage were closed, when the elastic mount receives vibrations in a relatively high frequency range. Consequently, the dynamic spring constant of the elastic mount is undesirably increased, and the vibration isolating characteristics of the mount are considerably deteriorated.

In view of the above situation, there is proposed in JP-A-2-245538 (published in 1990) a cylindrical elastic mount having a first and a second orifice passage which are formed independently of each other by closing respective grooves formed in an outer circumferential surface of the elastic body. The second orifice passage has a higher ratio of its cross sectional area to its length than that of the first orifice passage. This elastic mount further includes a gate valve mounted on the outer sleeve, which valve gets into or gets out of the second orifice passage so as to inhibit or permit flow of the fluid through the second orifice passage, respectively.

When the gate valve is operated to its closing position for inhibiting the fluid flow therethrough, the cylindrical elastic mount described above provides a sufficiently high damping effect for the low-frequency vibrations, based on the fluid flow through the first orifice passage. When the gate valve is operated to its open position for permitting the fluid flow therethrough, the elastic mount provides a sufficiently high isolating effect for the high-frequency vibrations, based on the fluid flow through the second orifice passage. Thus, the vibration damping or isolating characteristics of the elastic mount can be suitably controlled by operating the gate valve.

In the thus constructed fluid-filled cylindrical elastic mount, however, the gate valve is repeatedly brought into and out of the fluid in the second orifice passage, through the outer sleeve, making it difficult to ensure sufficient fluid-tightness at a portion of the mount where the gate valve is in sliding contact with the outer sleeve. In particular, it is extremely difficult to assure sufficiently high durability of the mount if the gate valve is required to frequently get into and out of the second orifice passage, through the outer sleeve.

Further, the outer sleeve of the fluid-filled cylindrical elastic mount of the above type needs to be formed with a mounting seat for supporting the gate valve. Therefore, the outer sleeve must be formed by die casting or other molding technique, resulting in reduced efficiency and increased cost in fabricating the elastic mount.

SUMMARY OF THE INVENTION

It is therefore an object of the present invention to provide a fluid-filled cylindrical elastic mount which exhibits different vibration damping or isolating characteristics due to flow of a fluid contained therein, depending upon the type of input vibrations, and which assures excellent fluid-tightness and durability, and can be fabricated at a reduced cost, with improved efficiency.

The above object will be accomplished according to the principle of the present invention, which providers a fluid-filled cylindrical elastic mount comprising: an inner sleeve and an outer sleeve which are radially spaced apart from each other, the outer sleeve having a window formed through an axially intermediate portion thereof; an elastic body interposed between the inner and outer sleeves, for elastically connecting the inner and outer sleeves, the elastic body at least partially defining a pair of fluid chambers filled with a non-compressible fluid; an orifice structure provided on an outer circumferential surface of the elastic body, for at least partially defining a first orifice passage, and a second orifice passage having a higher ratio of a cross sectional area thereof to a length thereof than that of the first orifice passage, each of the first and second orifice passages communicating with the pair of fluid chambers, at least a portion of the second orifice passage being formed as a tunnel that extends through the orifice structure, the orifice structure including a tunnel-defining portion defining the tunnel of the second orifice passage, the tunnel-defining portion having a radially outer surface which is exposed to an outside of the elastic mount through the window of the outer sleeve; and a valve assembly comprising a rotary valve, and a valve housing in which the rotary valve is rotatably and fluid-tightly received, the rotary valve being rotated around an axis thereof to be selectively placed in a first position for permitting flow of the non-compressible fluid through the second orifice passage, and in a second position for inhibiting the flow of the non-compressible fluid through the second orifice passage, the valve assembly being fluid-tightly secured to the radially outer surface of the tunnel-defining portion of the orifice structure, such that the rotary valve is located within the tunnel of the second orifice passage.

In the present fluid-filled cylindrical elastic mount constructed as described above, the rotary valve is employed as valve means for selectively opening and closing the second orifice passage. Therefore, a portion of the rotary valve which is in sliding contact with a member can ensure sufficient fluid-tightness and high durability, as compared with the conventional sliding-type gate valve as described above. Further, the fluid-tightness of the sliding portion of the rotary valve is more easily and effectively achieved since the rotary valve is received in the valve housing and then mounted in the body of the elastic mount. The provision of the valve housing also leads to improved efficiency with which the elastic mount is fabricated.

Moreover, the valve housing is directly secured to the orifice structure in the fluid-filled cylindrical elastic mount. Therefore, the outer sleeve need not be formed with a mounting seat for supporting the orifice structure, and may be formed from an ordinary cylindrical member. Further, the rotary valve can be easily positioned with respect to the second orifice passage with high accuracy. Thus, the present elastic mount can be fabricated with improved efficiency, at a significantly reduced cost.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
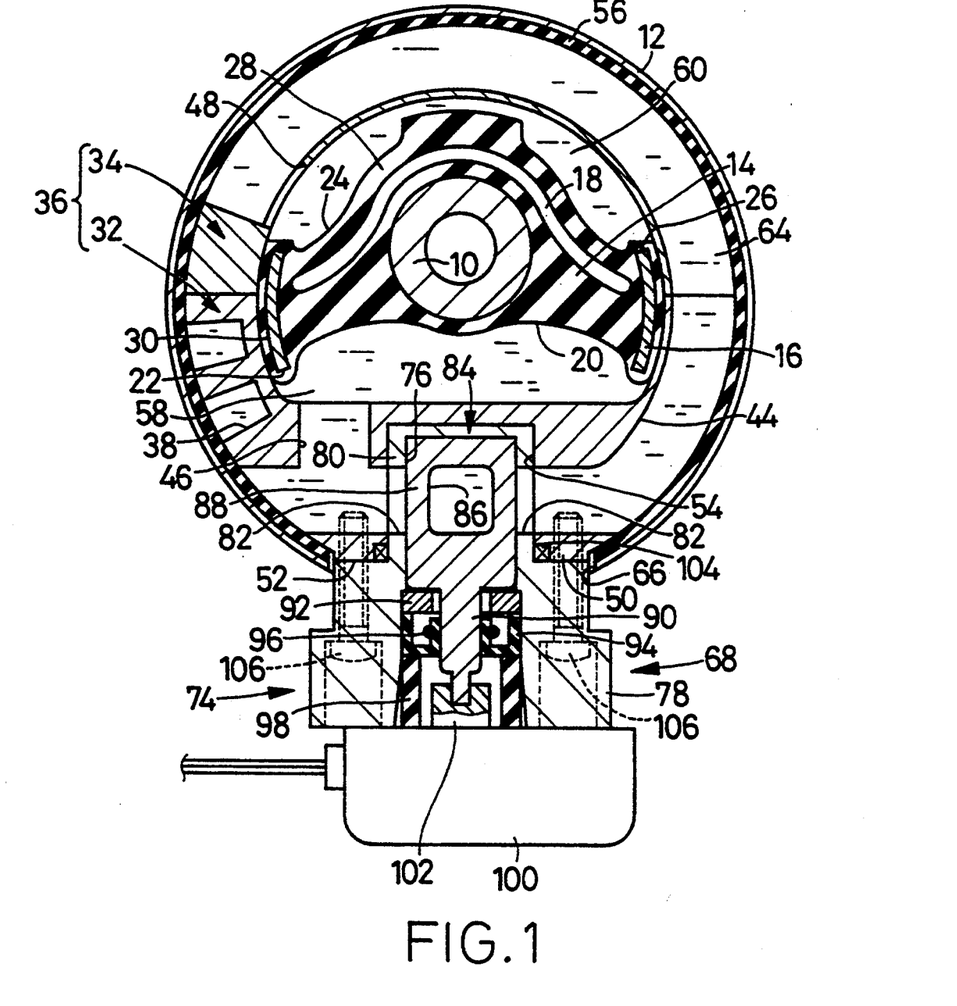
FIG. 1 is an elevational view in transverse cross section of one embodiment of a fluid-filled cylindrical elastic mount of the present invention in the form of an engine mount for a motor vehicle.
Figure 2:
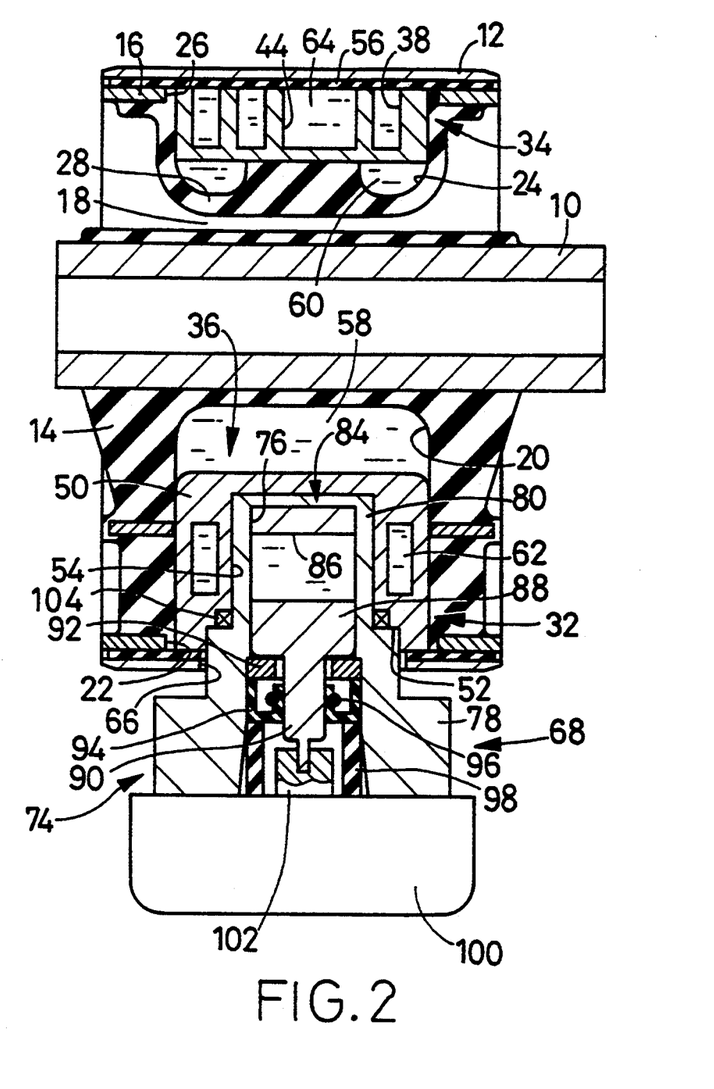
FIG. 2 is an elevational view in axial cross section of the engine mount of FIG. 1.
Figure 3:
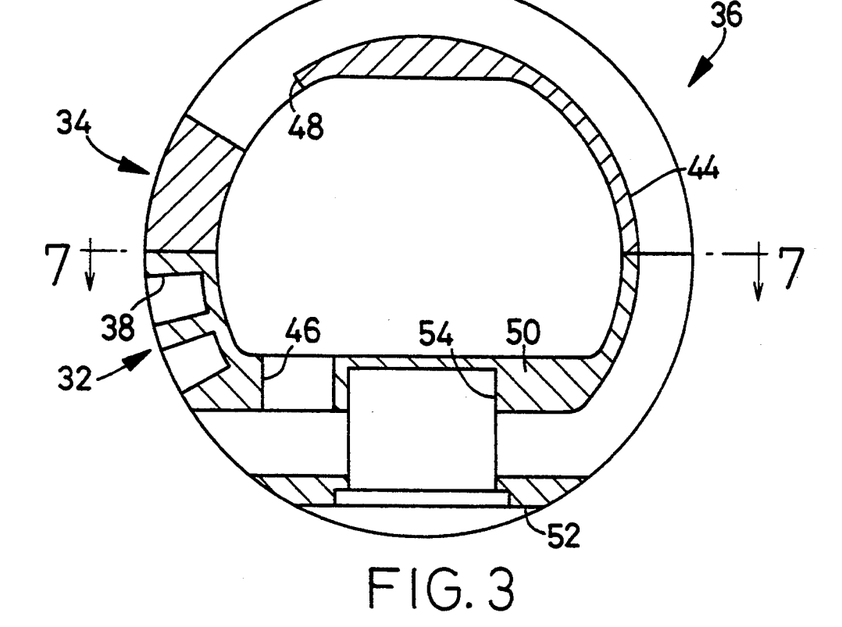
FIG. 3 is a transverse cross sectional view showing an orifice structure used in the engine mount of FIG. 1.
Figure 4:
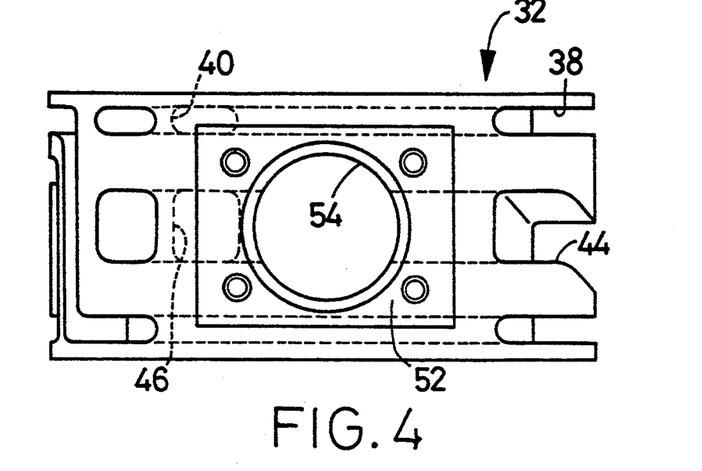
FIG. 4 is a bottom plan view showing the orifice structure of FIG. 3.
Figure 5:
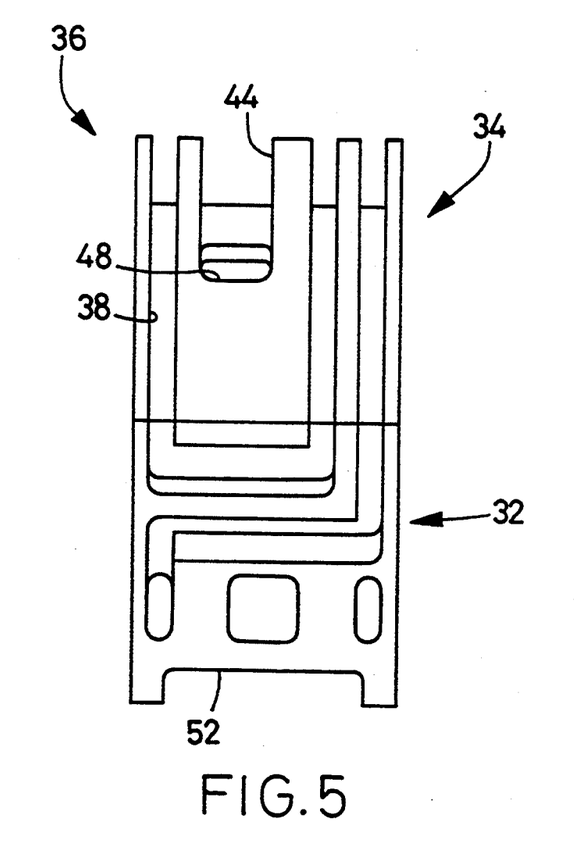
FIG. 5 is a side elevational view showing the orifice structure as viewed from the left-hand side of FIG. 3.
Figure 6:
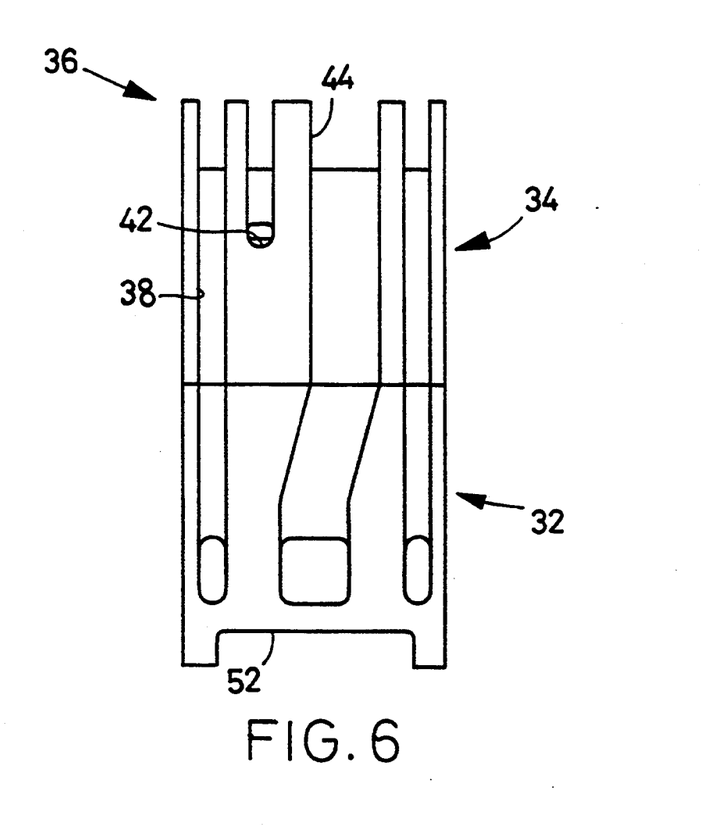
FIG. 6 is a side elevational view showing the orifice structure as viewed from the right-hand side of FIG. 3.
Figure 7:
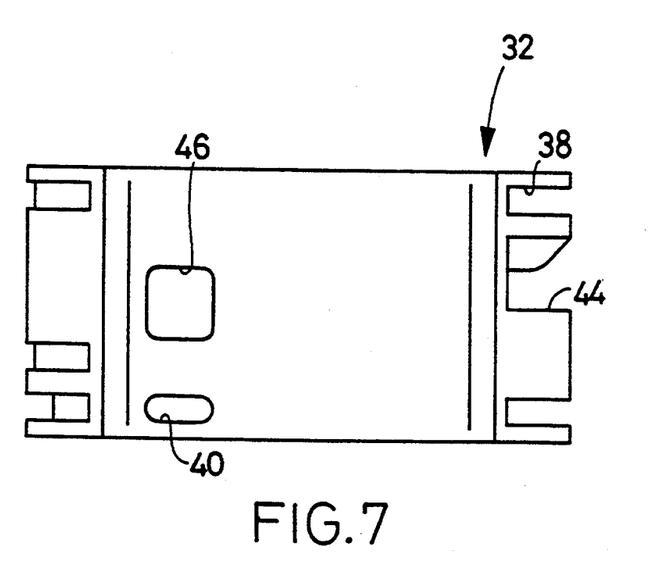
FIG. 7 is a cross sectional view taken along line 7—7 of FIG. 6.

Referring first to FIGS. 1 and 2 showing one embodiment of the present invention in the form of an engine mount for a motor vehicle, reference numerals 10 and 12 respectively denote an inner sleeve and an outer sleeve, both of which are made of metal. These inner and outer sleeves 10, 12 are disposed in eccentric relation with each other, with a suitable radial spacing therebetween, and are connected to each other by an elastic body 14 interposed between the sleeves 10, 12.

The engine mount as described above is installed on the motor vehicle so as to mount a power unit of the vehicle including its engine upon the vehicle body, such that the inner sleeve 10 is fixed to the vehicle body while the outer sleeve 12 is fixed to the power unit. With the engine mount thus installed on the vehicle, the weight of the power unit is applied between the inner and outer sleeves 10, 12, whereby the elastic body 14 is elastically deformed to thereby bring the two sleeves 10, 12 into substantially concentric or coaxial relation with each other. This engine mount receives a vibrational load to be damped or isolated, in a diametric direction in which the inner and outer sleeves 10, 12 are eccentric with each other, i.e., in a vertical direction as viewed in FIG. 1.

More specifically, the inner sleeve 10 is a cylindrical member having a relatively large thickness. Radially outwardly of this inner sleeve 10, there is disposed an intermediate sleeve 16 which is a cylindrical metallic member having a relatively small thickness. This intermediate sleeve 16 is eccentrically offset with respect to the inner sleeve 10 in the vertical direction of FIG. 1. The elastic body 14 is interposed between the inner sleeve 10 and intermediate sleeve 16, such that the elastic body 14 is secured to an outer circumferential surface of the inner sleeve 10 and an inner circumferential surface of the intermediate sleeve 16 by means of vulcanization. Thus, an integral vulcanized assembly consisting of the inner sleeve 10, elastic body 14 and intermediate sleeve 16 is formed.

The elastic body 14 has an axial void 18 formed in its circumferential portion located on one side of the inner sleeve 12 as viewed in the load-receiving direction (vertical direction of FIG. 1), at which portion the radial distance between the inner and intermediate sleeves 10, 16 is smaller than that on the other side of the inner sleeve 10. The axial void 18 is formed over the entire axial length of the elastic body 14, and extends between the inner and intermediate sleeves 10, 16 over substantially half of the circumference of these sleeves. This axial void 18 serves to reduce a tensile stress which is applied to the elastic body 14 due to the weight of the power unit when the engine mount is installed on the vehicle as described above.

The elastic body 14 further has a first pocket 20 formed in an axially middle part of its circumferential portion located on the other side of the inner sleeve 10 at which the radial distance between the inner and intermediate sleeves 10, 16 is larger. This first pocket 20 is open in a radially outward direction on the outer circumferential surface of the intermediate sleeve 16, through a first window 22 formed through the sleeve 16.

On the above-indicated one side of the inner sleeve 10 where the radial distance between the inner and intermediate sleeves 10, 16 is smaller, the elastic body 14 has a second pocket 24 formed in its axially middle part, such that the first and second pockets 20, 24 are opposed to each other via the inner sleeve 10 in the above-indicated load-receiving direction. This second pocket 24 is open in a radially outward direction on the outer circumferential surface of the intermediate sleeve 16, through a second window 26 formed through the sleeve 16. This second pocket 24 is partially defined by a relatively thin bottom wall portion 28 as part of the elastic body 14, which is located adjacent to the axial void 18. Thus, the bottom wall portion 28 serves as a flexible diaphragm for partially defining an equilibrium chamber 60 (which will be described) provided by the second pocket 24.

The intermediate sleeve 16 has diametrically opposite, axially middle portions whose diameter is smaller than that of the other portions, whereby a pair of circumferential grooves 30 are formed by the sleeve 16. These grooves 30 extend in the circumferential direction of the engine mount, and are opposed to each other in a diametric direction perpendicular to the load-receiving direction. Each of the circumferential grooves 30 is adapted to connect the corresponding circumferential ends of the first and second windows 22, 26 as respective openings of the first and second pockets 20, 24. Thus, the first pocket 20 and second pocket 24 communicate with each other through the two circumferential grooves 30.

The elastic body 14 of the thus constructed integral vulcanized assembly is preliminarily compressed as needed by reducing the diameter of the intermediate sleeve 16. Thereafter, a first and a second orifice member 32, 34 each having a generally semi-circular shape are mounted on the engine mount so as to face each other in the diametric direction in which the first and second pockets 20, 24 are opposed to each other. The first and second orifice members 32, 34 abut on each other at their corresponding circumferential ends to constitute a generally cylindrical orifice structure 36 which is fitted in the circumferential grooves 30 of the intermediate sleeve 16.

Referring next to FIGS. 3 through 7, the orifice structure 36 has a first groove 38 formed in its outer circumferential surface to extend in the circumferential direction thereof over a substantially two and a half rounds of the mount. The first groove 38 turns several times. That is, the groove 38 has elongate portions that extend in the circumferential direction, and relatively short connecting portions that extend in the axial direction of the mount so as to connect the elongate portions. With the orifice structure 36 mounted on the above-indicated integral vulcanized assembly, the first groove 38 is open at its opposite ends to the first and second pockets 20, 24, through respective through-holes 40, 42 formed through a bottom wall of the groove 38.

The orifice structure 36 further has a second groove 44 formed in its outer circumferential surface to extend in the circumferential direction thereof over a substantially half round of the mount. The second groove 44 has a larger cross sectional area than the first groove 38, and is formed independently of or separately from the first groove 38. With the orifice structure 36 mounted on the above-indicated integral vulcanized assembly, the second groove 44 is open at its opposite ends to the first and second pockets 20, 24, through respective through-holes 46, 48 formed through a bottom wall of the groove 44.

The semi-circular first orifice member 32 provided on the side of the first pocket 20 has a circumferentially middle, thick-walled tunnel-defining portion 50, through which the first and second grooves 38, 44 extend like tunnels within the orifice member 32 in its circumferential direction.

The tunnel-defining portion 50 of the first orifice member 32 has a radially outer flat surface which serves as a mounting seat 52 on which a valve assembly 68 (which will be described) is to be seated. The tunnel-defining portion 50 further has a valve mounting hole 54 formed through a middle portion of the mounting seat 52, so as to extend radially inwards and communicate with the second groove 44 formed as a tunnel extending through the orifice member 32.

After the orifice structure 36 is mounted on the integral assembly of the inner and intermediate sleeves 10, 16 and elastic body 14, the outer sleeve 12 is fitted on the outer circumferential surface of the integral assembly with the orifice structure 36, and is fixed to the outer surface of the intermediate sleeve 16 by reducing the diameter of the outer sleeve 12. A relatively thin sealing rubber layer 56 is formed over substantially the entire area of the inner circumferential surface of the outer sleeve 12, so as to provide a fluid-tight seal between the intermediate sleeve 16 and the outer sleeve 12.

The outer sleeve 12 fitted on the intermediate sleeve 16 is adapted to fluid-tightly close the openings of the first and second pockets 20, 24 of the elastic body 14, and the openings of the first and second grooves 38, 44 formed in the orifice structure 36.

With the first and second pockets 20, 24 filled with a suitable non-compressible fluid as described below, the first pocket 20 provides a pressure-receiving fluid chamber 58 which undergoes pressure changes based on elastic deformation of the elastic body 14 when vibrations are applied between the inner and outer sleeves 10, 12, while the second pocket 24 provides the above-indicated equilibrium fluid chamber 60 which permits volumetric changes thereof based on elastic deformation of the bottom wall portion 28. With the first and second grooves 38, 44 closed by the outer sleeve 12, the first groove 38 provides a first orifice passage 62 which communicates with the pressure-receiving and equilibrium chambers 58, 60, while the second groove 44 provides a second orifice passage 64 which also communicates with the pressure-receiving and equilibrium chambers 58, 60. The second orifice passage 64 has a ratio of the cross sectional area to the length thereof which is larger than that of the first orifice passage 62, and is formed independently of or separately from the first orifice passage 62.

Generally, the non-compressible fluid contained in the pressure-receiving and equilibrium chambers 58, 60 is selected from water, alkylene glycol, polyalkylene glycol, silicone oil and others. The filling of the fluid chambers 58, 60 with the non-compressible fluid may be accomplished by assembling the engine mount together within a mass of the fluid.

The outer sleeve 12 has a window 66 formed through an axially intermediate portion thereof which is radially aligned with the mounting seat 52 of the first orifice member 32. Thus, the mounting seat 52 is exposed to the outside of the mount through the window 66, so that the valve assembly 68 can be fixedly mounted on the mounting seat 52, as described later.

The valve assembly 68 includes a valve housing 74 which is formed of a metallic or resin material and integrally molded by die casting or injection molding, for example. The valve housing 74 has a valve receiving hole 76 formed in a central portion thereof and having a circular cross section, and assumes a generally cylindrical shape with a bottom wall formed at its upper end, as shown in FIGS. 1 and 2. The valve housing 74 consists of a thick-walled cylindrical base 78 formed on the side of the opening of the valve receiving hole 76, and a thin-walled cylindrical insert 80 having the bottom wall at the end of its cylindrical wall. A pair of communication holes 82, 82 are formed through diametrically opposite portions of the cylindrical wall of the insert 80.

Within the valve receiving hole 76 of the valve housing 74, there is disposed a rotary valve 84 which consists of a columnar head portion 88, and a rod-like leg portion 90 that protrudes from one axial end of the head portion 88. The head portion 88 has a valve bore 86 formed therethrough in a direction perpendicular to the axis of the rotary valve 84. The rotary valve 84 is fitted into the valve receiving hole 76 of the housing 74 so that the head portion 88 abuts on the bottom wall of the insert 80 of the housing 74. With a retainer ring 92 press-fitted into the valve receiving hole 76, the head portion 88 is held within the insert 80 such that the portion 88 is rotatable about its axis. In this arrangement, the rotary valve 84 is rotated in the valve housing 74, such that the valve 84 is selectively placed in a first position for communicating the communication holes 82, 82 of the housing 74 with each other through the valve bore 86, and in a second position for shutting off or disconnecting the holes 82, 82 from each other.

An annular sealing member 94 is provided on the leg portion 90 of the rotary valve 84, and fixed thereto by means of a retainer ring 96. The sealing member 94 provides a fluid-tight seal between the valve receiving hole 76 of the housing 74 and the leg portion 90 of the rotary valve 84, while permitting rotation of the rotary valve 84. To assure improved fluid-tightness and durability of the mount, a cylindrical dust seal 98 is disposed on one axial end face of the sealing member 94 remote from the retainer ring 92.

A drive motor 100 is fixedly provided on the axial end face of the cylindrical base 78 of the housing 74, such that an output shaft 102 of the motor 100 engages the leg portion 90 of the rotary valve 84. Thus, the rotary valve 84 is driven or rotated by the drive motor 100.

The thus constructed valve assembly 68 is mounted on the orifice structure 36, such that the insert 80 of the housing 74 is inserted into the valve mounting hole 54 of the first orifice member 32 with the communication holes 82, 82 of the insert 80 held in fluid communication with the second orifice passage 64, and such that the base 78 of the housing 74 is fixed to the mounting seat 52 of the first orifice member 32 by means of a plurality of bolts 106.

An annular seal ring 104 is interposed between the abutting face of the valve housing 74 and the mounting seat 52 of the orifice structure 36, so as to seal the interface between the housing 74 and the orifice structure 36, assuring fluid-tightness of the second orifice passage 64.

In the engine mount constructed as described above, the second orifice passage 64 can be selectively opened and closed by rotating the rotary valve 84. Namely, when the rotary valve 84 is placed in the above-indicated second position, the second orifice passage 64 is placed in its closed position, that is, the flow of the fluid through the second orifice passage 64 is inhibited by the valve 84. In this condition, the engine mount exhibits an excellent damping effect with respect to low-frequency vibrations, such as shake and bounce, based on the resonance of the fluid flowing through the first orifice passage 62 between the pressure-receiving chamber 58 and equilibrium chamber 60. When the rotary valve 84 is placed in the above-indicated first position, on the other hand, the second orifice passage 84 is placed in its open position, that is, the flow of the fluid through the second orifice passage 84 is permitted. In this condition, the engine mount exhibits a sufficiently low dynamic spring constant with respect to high-frequency vibrations, such as booming noise, based on the resonance of the fluid flowing through the second orifice passage 64 between the pressure-receiving chamber 58 and equilibrium chambers 60. FIGS. 1 and 2 show the rotary valve 84 when it is held in the second position for closing or shutting off the second orifice passage 64.

Since the instant engine mount employs the rotary valve 84 as valve means for selectively opening and closing the second orifice passage 64, the positions of the sealing members and rings 94, 96 and 98 and 104 relative to the valve body (84) do not change upon opening and closing of the rotary valve 84, unlike the conventional sliding-type gate valve. Thus, the instant engine mount assures excellent fluid-tightness with high durability at its portion where the valve body is mounted on the orifice structure.

Further, since the rotary valve 84 is received in the integrally formed valve housing 74 which is then mounted on the orifice structure 36, the engine mount can easily provide improved fluid-tightness at its portion where the valve 84 is rotated relative to the housing 74 and the orifice structure 36. The provision of the housing 74 is also advantageous in that the instant engine mount can be fabricated with improved efficiency.

Since the valve housing 74 of the valve assembly 68 is fixed to the mounting seat 52 of the orifice structure 36 in the instant engine mount, the outer sleeve 12 need not be formed with a mounting seat or the like for supporting the valve means. That is, the outer sleeve 12 may be formed from an ordinary cylindrical member, whereby the engine mount can be fabricated with improved efficiency, at a reduced cost.

As described above, the valve housing 74 of the valve assembly 68 is directly fixed to the orifice member 36. Therefore, upon mounting of the valve assembly 68 in the engine mount, the valve assembly 68 can be easily positioned with respect to the orifice structure 36, as compared with the conventional valve means which is fixed to the outer sleeve, thus assuring further improved efficiency in fabricating the engine mount.

While the present invention has been described in its presently preferred embodiment, it is to be understood that the invention is not limited to the details of the illustrated embodiment, but may be otherwise embodied.

For instance, the cross sectional areas and lengths of the first and second orifice passages 62, 64 are not limited to those of the illustrated embodiment, but may be changed as needed depending upon the required damping or isolating characteristics of the elastic mount.

Further, the structure of the sealing member 94 for sealing the rotary valve 84 against the valve housing 74 is not limited to that of the illustrated embodiment, but may be modified as desired. For instance, the sealing member 94 may be replaced by a composite sealing member having a metallic core plate covered with a rubber layer.

While the engine mount of the motor vehicle has been illustrated above as one embodiment of the present invention, the principle of the present invention may be also advantageously applied to a vehicle body mount or a differential gear mount of a motor vehicle, or to various cylindrical elastic mounts other than those provided on the motor vehicle.

It is to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount comprising:

an inner sleeve and an outer sleeve which are radially spaced apart from each other, said outer sleeve having a window formed through an axially intermediate portion thereof;

an elastic body interposed between said inner and outer sleeves, for elastically connecting the inner and outer sleeves, said elastic body at least partially defining a pair of fluid chambers filled with a non-compressible fluid;

a generally cylindrical orifice structure provided on an outer circumferential surface of said elastic body, for at least partially defining a first orifice passage, and a second orifice passage having a higher ratio of a cross sectional area thereof to a length thereof than that of said first orifice passage, each of said first and second orifice passages communicating with said pair of fluid chambers, at least a portion of said second orifice passage being formed as a tunnel that extends through said orifice structure, said orifice structure including a tunnel-defining portion defining said tunnel of said second orifice passage, said tunnel-defining portion having a radially outer surface which is exposed to an outside of the elastic mount through said window of said outer sleeve; and a valve assembly comprising a rotary valve, and a valve housing in which said rotary valve is rotatably and fluid-tightly received, said rotary valve being rotated around an axis thereof to be selectively placed in a first position for permitting flow of said non-compressible fluid through said second orifice passage, and in a second position for inhibiting said flow of said non-compressible fluid through said second orifice passage, said valve assembly being fluid-tightly secured to said radially outer surface of said tunnel-defining portion of said orifice structure, such that said rotary valve is located within said tunnel of said second orifice passage.

2. A fluid-filled cylindrical elastic mount as defined in claim 1, wherein said orifice structure consists of a first and a second semicircular orifice member which are opposed to each other in a diametric direction in which said pair of fluid chambers are opposed to each other, and which abut on each other to form a cylindrical shape of the orifice structure, said tunnel-defining portion being formed by a circumferentially middle portion of one of said first and second orifice members.

3. A fluid-filled cylindrical elastic mount as defined in claim 1, wherein said tunnel-defining portion has a thickness which is larger than that of the other portions of the orifice structure.

4. A fluid-filled cylindrical elastic mount as defined in claim 1, wherein said radially outer surface of said tunnel-defining portion is a flat surface on which said valve assembly is seated, said tunnel-defining portion having a valve-mounting hole formed through a middle portion of said flat surface, said valve-mounting hole communicating with said tunnel of said second orifice passage.

5. A fluid-filled cylindrical elastic mount as defined in claim 1, wherein said valve housing consists of a thin-walled cylindrical portion which is inserted in said tunnel-defining portion of said orifice structure, and a thick-walled cylindrical portion disposed on said radially outer surface of the tunnel-defining portion, said thin-walled cylindrical portion having a bottom wall at an axial end thereof, and two diametrically opposite through-holes which communicate with said tunnel of said second orifice passage.

6. A fluid-filled cylindrical elastic mount as defined in claim 5, wherein said rotary valve consists of a columnar head portion fitted in said valve housing, and a leg portion protruding radially outwards from said head portion, said head portion having a valve bore formed therethrough in a diametric direction perpendicular to an axis of the rotary valve, said valve bore being held in fluid communication with said through-holes of said thin-walled cylindrical portion of said valve housing when said rotary valve is placed in said first position.

7. A fluid-filled cylindrical elastic mount as defined in claim 6, wherein said valve assembly further comprises a sealing member disposed between said leg portion of said rotary valve and said valve housing, for providing a seal between said rotary valve and said valve housing while permitting rotation of the rotary valve.

8. A fluid-filled cylindrical elastic mount as defined in claim 6, wherein said valve assembly further comprises a drive motor for rotating said rotary valve, said drive motor having an output shaft which engages said leg portion of the rotary valve.

9. A fluid-filled cylindrical elastic mount as defined in claim 1, further comprising a sealing member disposed between said valve housing of said valve assembly and said tunnel-defining portion of said orifice structure.

10. A fluid-filled cylindrical elastic mount as defined in claim 1, further comprising an intermediate sleeve disposed between said outer sleeve and said elastic body, said intermediate sleeve having a pair of windows corresponding to said pair of fluid chambers, and forming diametrically opposite, circumferential grooves connecting said windows, said orifice structure being received in said circumferential grooves of the intermediate sleeve.

* * * * *